United States Patent
Huang

Patent Number: 5,695,418
Date of Patent: Dec. 9, 1997

[54] SHOCK ABSORBING GRIP FOR RACQUETS AND THE LIKE

[76] Inventor: Ben Huang, 19472 Woodlands La., Huntington Beach, Calif. 92648

[21] Appl. No.: 550,219

[22] Filed: Oct. 30, 1995

Related U.S. Application Data

[63] Continuation of Ser. No. 953,190, Sep. 29, 1992, abandoned, which is a continuation of Ser. No. 890,383, May 26, 1992, abandoned, which is a continuation of Ser. No. 637,931, Jan. 14, 1991, abandoned.

[51] Int. Cl.$^6$ ........................................... A63B 49/08
[52] U.S. Cl. ............................................ 473/549; 473/300
[58] Field of Search ............................... 473/549, 553, 473/300, 301, 302, 303

[56] References Cited

U.S. PATENT DOCUMENTS

| | | | |
|---|---|---|---|
| 1,139,843 | 5/1915 | Brown | 273/81.6 |
| 1,701,856 | 2/1929 | Kraeuter | 273/81 R |
| 1,940,104 | 12/1933 | Russell et al. | 273/81.5 |
| 2,003,917 | 6/1935 | Bowden | 273/75 |
| 3,654,066 | 4/1972 | Fukushima | 428/304.4 X |
| 3,848,480 | 11/1974 | Oseroff et al. | 273/81.5 X |
| 3,860,469 | 1/1975 | Gregorian et al. | 273/81 R X |
| 4,284,275 | 8/1981 | Fletcher | 273/75 |
| 4,347,280 | 8/1982 | Law et al. | 273/75 |
| 4,567,091 | 1/1986 | Spector | 273/75 |
| 4,662,415 | 5/1987 | Proutt | 273/81 R X |

FOREIGN PATENT DOCUMENTS

| | | | |
|---|---|---|---|
| 2398099 | 3/1979 | France | 273/81.6 |
| 2805314 | 8/1979 | Germany | 273/75 |
| 3414978 | 10/1985 | Germany | 273/75 |
| 870021 | 6/1961 | United Kingdom | 273/81.6 |
| 979242 | 1/1965 | United Kingdom | 273/81.5 |

*Primary Examiner*—William E. Stoll
*Attorney, Agent, or Firm*—Fulwider Patton Lee & Utecht, LLP

[57] ABSTRACT

A shock absorbing grip for the handle of a tennis racquet or the like having a polyurethane layer bonded to a felt layer where the ratio of the thickness of the polyurethane layer to the felt layer is equal to or larger than about 0.18. The bonded-together layers are configured as a strip which is wrapped about the racquet handle.

2 Claims, 2 Drawing Sheets

SHOCK ABSORBING GRIP FOR RACQUETS AND THE LIKE

This application is a continuation of application Ser. No. 07/953,190 filed Sep. 29, 1992 now abandoned, which was a continuation of application Ser. No. 07/890,383 filed May 26, 1992 now abandoned, which was a continuation of application Ser. No. 07/637,931 filed Jan. 14, 1991 now abandoned.

BACKGROUND OF THE INVENTION

The present invention relates to an improved grip for racquets and other devices employing handles that are subject to shock when such devices are impacted, as for example, tennis ball racquets, racquetball racquets, golf clubs, baseball bats and hammers.

It is well-known that shock generated by impact between a device such as a tennis racquet and a tennis ball, can affect muscle tissue and arm joints such as elbow joints. Such shock often results in "tennis elbow" which is a painful affliction commonly experienced by active tennis players. Medical theories attribute "tennis elbow" to continuous exposure of the playing arm of a tennis player to shock and vibration generated by striking a tennis ball with a tennis racquet. The energy generated is usually of high frequency and short duration with rapid decay and which is often known as "impact shock". Various types of grips have been proposed for inhibiting "tennis elbow", however, such grips have not solved such problem. The grip of the present invention successfully reduces or even eliminates "tennis elbow" type shock to the muscle tissue and arm joints of the users of tennis racquets, racquetball racquets, golf clubs, baseball bats, and other impact imparting devices such as hammers.

The prior art grips of this type have conventionallly utilized a layer of polyurethane backed with a layer of felt. In general, the felt layer has a thickness of about 1.40 mm. The polyurethane layer is generally thinner than 0.25 mm and has been considered only as providing tackiness, i.e., resistance to the slip caused by a sweaty hand. The polyurethane has not been considered to be useful for inhibiting shock. The felt was relied upon to cushion the user's arm and hand against the shock created when the ball hits the racquet.

Typically, the thickness ratio of the prior art grips was as follows, where PU=polyurethane and F refers to felt:

| Grip Thickness (mm) | PU (mm) | F (mm) | PU/F |
| --- | --- | --- | --- |
| 1.3 | 0.15 | 1.15 | 0.13 |
| 1.4 | 0.15 | 1.25 | 0.12 |
| 1.5 | 0.15 | 1.35 | 0.111 |
| 1.6 | 0.2 | 1.4 | 0.142 |
| 1.7 | 0.2 | 1.5 | 0.133 |
| 1.8 | 0.2 | 1.6 | 0.125 |
| 1.9 | 0.2 | 1.8 | 0.111 |
| 2.0 | 0.25 | 1.75 | 0.142 |

Referring to the above table, for instance, the PU/F thickness ratio of a conventional grip with a thickness of 2.0 mm is 0.25 mm/1.75 mm or 0.142.

SUMMARY OF THE INVENTION

Applicant has discovered that greatly improved shock absorbing qualities may be obtained in a grip for a tennis racquet or the like where the thickness of the polyurethane layer relative to the thickness of the felt layer is increased over the ratio employed in prior art grips. Applicant has developed a grip particularly designed to provide excellent shock absorbing qualities when mounted upon the handle of "wide-body" tennis racquets which have recently achieved wide popularity. Applicant's improved grip utilizes the polyurethane layer not only to provide tackiness, but more importantly, to cushion the arm and hand of the racquet user against the shock created when the tennis ball hits the tennis racquet. A layer of felt is bonded to the inner surface of applicant's polyurethane layer in order to provide strength to such polyurethane layer and also as a means for attaching the bonded-together polyurethane layer and textile layer to the racquet handle. The improved grip of the present invention additionally aligns the pores of the polyurethane layer generally normal to the longitudinal axis of the racquet handle so as to further improve the cushioning characteristics of the polyurethane layer.

DETAILED DESCRIPTION OF A PREFERRED EMBODIMENT

Figure 5:
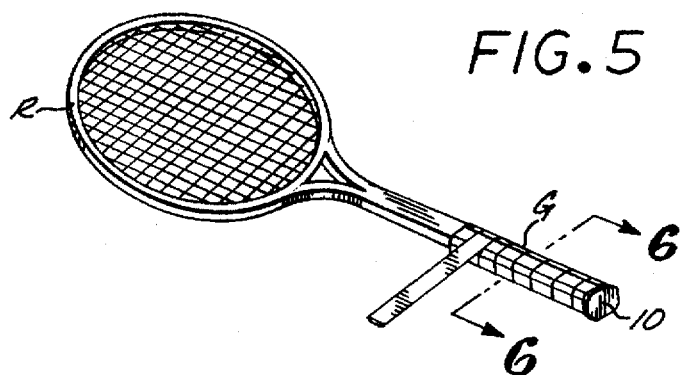
FIG. 5 is a perspective view in reduced scale showing the grip of FIGS. 1 through 4 being applied to the handle of a tennis racquet.
Figure 6:
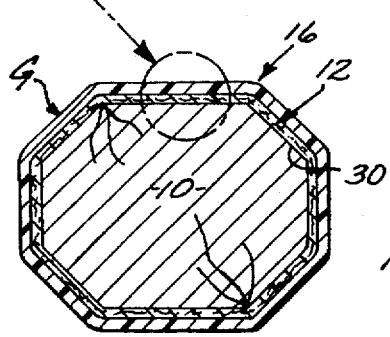
FIG. 6 is a vertical sectional view taken in enlarged scale along line 6—6 of FIG. 5.

Referring to the drawings, the improved shock absorbing grip G of the present invention is shown in FIG. 5 attached to the handle 10 of a tennis racquet R. The grip G includes an open-pored textile layer generally designated 12 having an inner surface 14 which is adhered to the racquet handle 10. The grip also includes a smooth closed pore polyurethane layer generally designated 16 which is bonded to the textile layer 12. The bonded-together polyurethane and textile layers are seen to be configured as a unitary strip which is wrapped about the racquet handle 10 in the manner depicted in FIG. 5.

Figure 4:
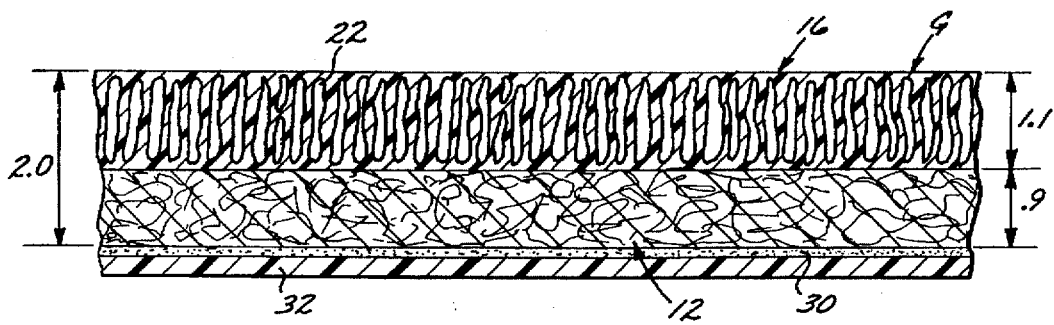
FIG. 4 is a further enlarged view of the encircled area designated 4 in FIG. 3.
Figure 7:
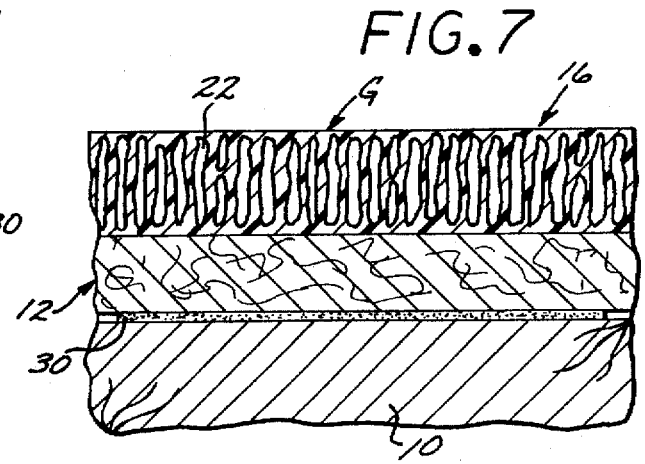
FIG. 7 is a further enlarged view of the encircled area designated 7 in FIG. 6.
Figure 8:
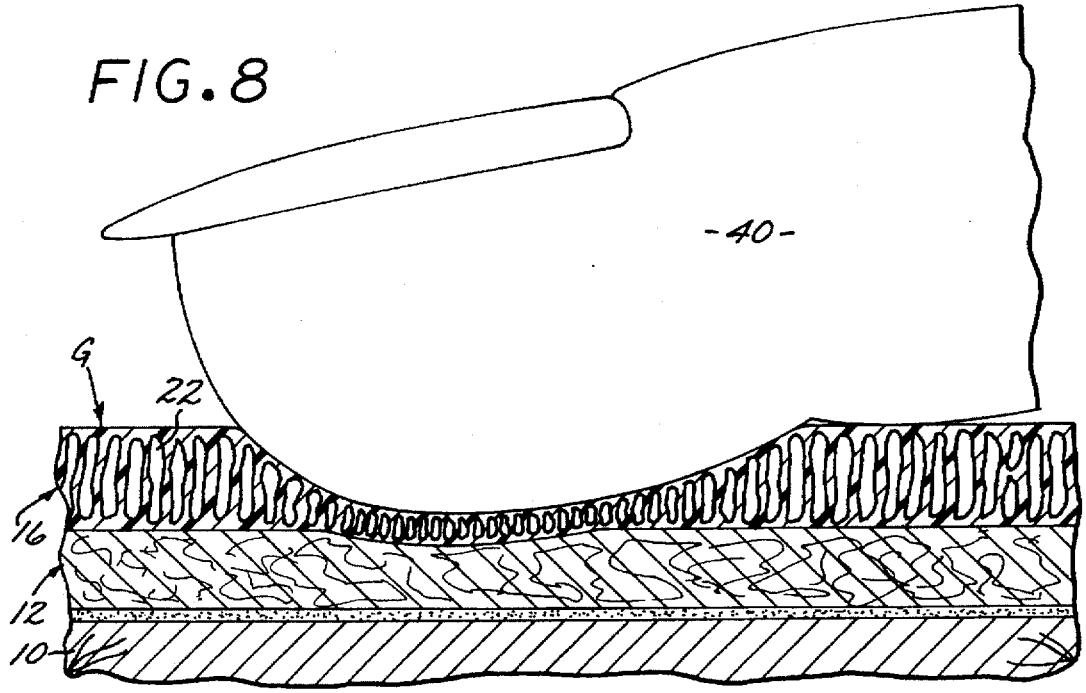
FIG. 8 is a sectional view showing how the improved grip of the present invention deforms when grasped by a user.

More particularly, the textile layer 12 is formed of a suitable open-pored material, such as felt, and has its upper surface 18 bonded to the lower surface 20 of the polyurethane layer 16. As indicated in FIGS. 4, 7 and 8, the polyurethane layer 16 is formed with pores 22 which extend vertically, i.e., generally normal to the longitudinal axis of racquet handle 10 when the grip is affixed to such handle. The polyurethane layer 16 may be formed in a conventional manner by coating one side of a felt strip with a solution of polyurethane (e.g., polyester or polyether) dissolved in dimethyl formamide (DMF), immersing the coated strip in water baths to displace the DMF and to cause the urethanes to coagulate, and finally driving off the water by the application of pressure and heat. In this manner, pores 22 extending perpendicularly relative to the strip's longitudinal axis are formed while the underside of the polyurethane strip is bonded to the outer surface 18 of the felt strip.

Figure 1:
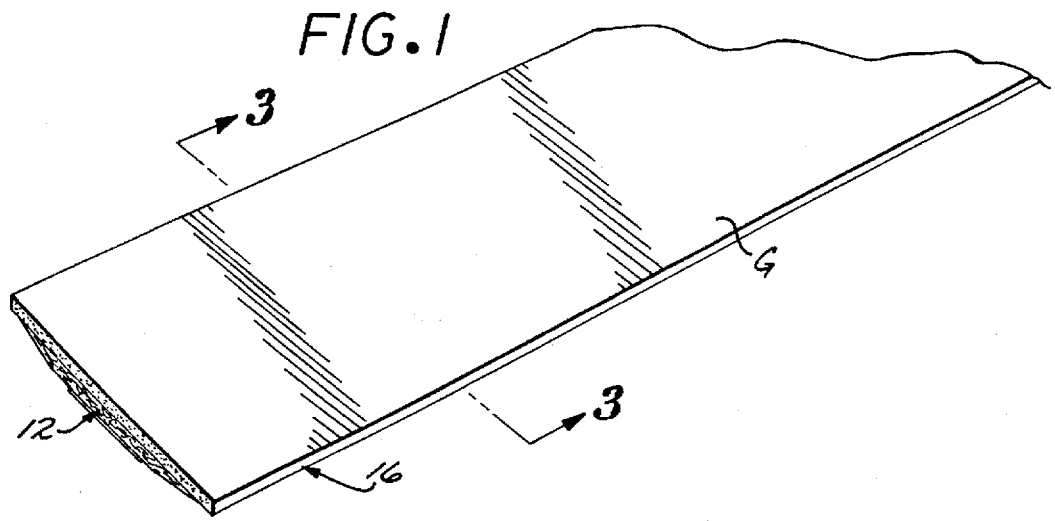
FIG. 1 is a broken perspective view of an improved shock absorbing grip embodying the present invention.
Figure 2:
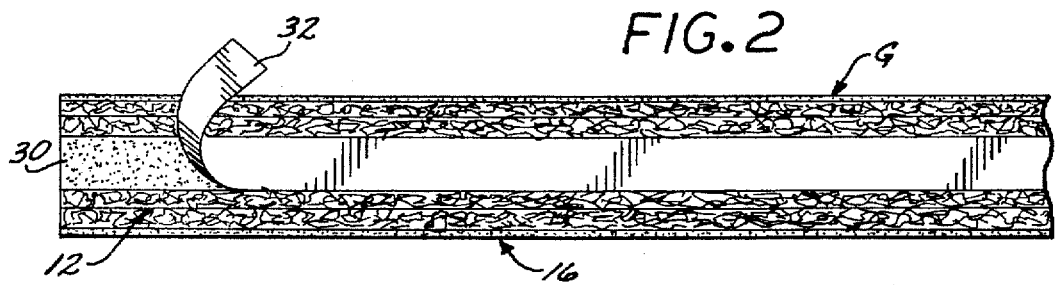
FIG. 2 is a broken view of the underside of said grip.
Figure 3:
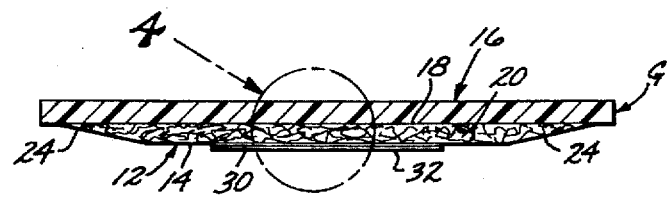
FIG. 3 is a vertical sectional view taken in enlarged scale along line 3—3 of FIG. 1.

As indicated in FIG. 3 the outer portions of the felt layer 12 are slanted upwardly and outwardly at 24 to facilitate wrapping of the completed polyurethane and felt strip around the racquet handle 10. The underside 14 of the felt is provided with a conventional layer 30 which is originally covered with a protective quick-release tape 32. To apply the grip G to the racquet handle 10 the protective tape 32 is stripped off the adhesive 30, as indicated in FIG. 2. Thereafter, the strip of bonded-together strip of polyurethane and felt is tightly wrapped around the racquet handle 10, as is conventional in mounting tennis handle grips of this type.

The purpose of the layer of polyurethane 16 is primarily to provide a cushioning effect for the grip when the tennis racquet R impacts a tennis ball (not shown). The polyurethane layer 16 also provides tackiness so as to inhibit the racquet user's hand from slippage as the tennis ball is struck. The felt layer 12 provides strength to the polyurethane layer 16 and also serves as a means for attaching the bonded-together polyurethane and felt strip to the racquet handle.

As noted hereinbefore, applicant has discovered that greatly improved shock absorbing qualities may be obtained in a tennis racquet grip where the thickness of the polyurethane layer relative to the thickness of the felt layer is increased over the ratio employed in prior art grips. More specifically, applicant considers that the ratio of the thickness of the polyurethane layer to the textile layer should be a minimum of approximately 0.18, i.e., equal to or larger than approximately 0.18. By way of example, applicant has determined that the polyurethane body/felt layer ratios set forth in the following table provide excellent results when utilized in a tennis racquet grip:

| Grip Thickness (mm) | PU (mm) | F (mm) | PU/F |
|---|---|---|---|
| 0.118 | 0.018 | 0.1 | 0.18 |
| 0.236 | 0.036 | 0.2 | 0.18 |
| 0.354 | 0.054 | 0.3 | 0.18 |
| 0.472 | 0.072 | 0.4 | 0.18 |
| 0.590 | 0.090 | 0.5 | 0.18 |
| 0.708 | 0.108 | 0.6 | 0.18 |
| 0.826 | 0.126 | 0.7 | 0.18 |
| 0.944 | 0.144 | 0.8 | 0.18 |
| 1.062 | 0.162 | 0.9 | 0.18 |
| 1.180 | 0.180 | 1.0 | 0.18 |
| 1.298 | 0.198 | 1.1 | 0.18 |
| 1.416 | 0.216 | 1.2 | 0.18 |
| 1.534 | 0.234 | 1.3 | 0.18 |
| 1.652 | 0.252 | 1.4 | 0.18 |
| 1.770 | 0.270 | 1.5 | 0.18 |
| 1.888 | 0.288 | 1.6 | 0.18 |
| 2.006 | 0.306 | 1.7 | 0.18 |
| 2.124 | 0.324 | 1.8 | 0.18 |
| 2.242 | 0.342 | 1.9 | 0.18 |
| 2.360 | 0.360 | 2.0 | 0.18 |
| 2.478 | 0.378 | 2.1 | 0.18 |
| 2.596 | 0.396 | 2.2 | 0.18 |
| 2.714 | 0.414 | 2.3 | 0.18 |
| 2.832 | 0.432 | 2.4 | 0.18 |
| 2.950 | 0.450 | 2.5 | 0.18 |
| 3.068 | 0.468 | 2.6 | 0.18 |
| 3.186 | 0.486 | 2.7 | 0.18 |
| 3.304 | 0.504 | 2.8 | 0.18 |
| 3.422 | 0.522 | 2.9 | 0.18 |
| 3.540 | 0.540 | 3.0 | 0.18 |

In the embodiment shown in the drawings, and as indicated in FIG. 4, in a grip having a total thickness of 2.0 mm, the polyurethane layer has a thickness of 1.1 mm, while the felt layer has a thickness of 0.9 mm, i.e., the thickness of the polyurethane body is about equal to or slightly thicker than the thickness of the textile body. Excellent results have been obtained with this ratio.

Referring now to FIG. 8, such figure shows how the improved grip G of the present invention deforms when grasped by the fingers 40 of a user. Thus, the user's fingers compress the polyurethane layer to a considerable extent while only slightly compressing the felt layer 12. Compression of the polyurethane is enhanced by the vertical alignment of the pores 22. It has been found that such compression greatly inhibits the shock applied by the racquet to the user's arm and hand created when the tennis ball hits the tennis racquet. Additionally, the extent of compression afforded by the polyurethane enhances the gripping power of the user's hand, particularly when coupled with the tackiness of the polyurethane.

Another advantage of the present invention results from the lower cost of the polyurethane as compared to the cost of the felt. Because of this differential in cost, the cost of manufacturing a grip embodying the present invention can be less than the cost of manufacturing prior art grips.

Various modifications and changes may be made with respect to the foregoing detailed description without departing from the spirit of the present invention.

I claim:

1. The combination of a handle for an impact imparting device and shock absorbing grip applied over such handle to conform to the external configuration of such handle, said combination comprising:

a strip which is spirally wrapped about said handle, the strip consisting of an open-pored textile layer having an inner surface adhered to and abutting said handle and a smooth closed pore polyurethane layer having its inner surface bonded to the outer surface of the textile layer remote from said handle, with the pores of such polyurethane layer extending generally normal to the longitudinal axis of said handle, the thickness ratio of the transverse central region of the polyurethane layer/textile layer being equal to or larger than approximately 0.18, and with the textile layer providing strength for the polyurethane layer while the polyurethane layer both absorbs shocks and provides tackiness so as to inhibit slippage of a user's hand relative to said handle with the thickness of the strip being substantially 1.3–2.0 mm;

the thickness of the textile layer tapering from a transverse central region towards the sides of the strip to facilitate wrapping of the strip about the handle; and an adhesive provided along the inner surface of the textile strip securing the strip to the handle.

2. The combination of claim 1, wherein the thickness of the polyurethane layer is about equal to the thickness of the textile layer.

* * * * *